United States Patent
Schurdak

[11] 3,870,680
[45] Mar. 11, 1975

[54] COPPER INHIBITORS FOR POLYOLEFINS

[76] Inventor: Edward Schurdak, 4 Harry Rd., Somerville, N.J. 08876

[22] Filed: Oct. 19, 1973

[21] Appl. No.: 408,212

[52] U.S. Cl. .................................. 260/45.85 B 260/45.9 NC, 260/45.95 R, 260/45.95 H, 260/45.95 C, 252/401
[51] Int. Cl. ............................................ C08f 45/60
[58] Field of Search ............... 260/459 NC, 559 H; 252/401

[56] References Cited
UNITED STATES PATENTS
3,772,245  11/1973  Dexter ....................... 260/45.9 NC Primary Examiner—V. P. Hoke
Attorney, Agent, or Firm—Philip Mintz

[57] ABSTRACT

Compounds of the formula

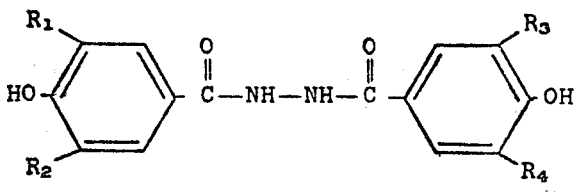

wherein $R_1$, $R_2$, $R_3$, and $R_4$ are each branched-chain alkyl of 3-8 carbon atoms, preferably t-butyl, are novel compounds, useful in combination with hindered-phenol antioxidants, for inhibiting high temperature degradation of polyolefins, especially polypropylene, in contact with copper as metal, alloys, oxides, or salts. These novel compounds can be prepared by (a) reacting a p-hydroxybenzoic acid with thionyl chloride to form a benzoyl chloride and then (b) reacting such benzoyl chloride with hydrazine.

11 Claims, No Drawings

COPPER INHIBITORS FOR POLYOLEFINS

This invention relates to the stabilization of polyolefins, especially those wherein the polyolefin chain contains a pluality of tertiary carbon atoms or branch points, such as polypropylene and polybutene-1, against degradation when in contact with copper, copper alloys, copper oxides, or copper salts. It also relates to certain novel compounds, useful in combination with hindered-phenol antioxidants for such stabilization.

It is well known that polyolefins are subject to degradation caused by heat, ultraviolet light, and oxygen and that many materials have been found to inhibit such degradation, such as antioxidants and ultraviolet absorbers. It is also well known that copper, whether in the form of copper metal, copper alloys, copper oxides, or copper salts, catalyzes or otherwise greatly increases the susceptibility of polyolefins to degradation on exposure to heat, as described in Hansen et al., J. Poly. Sci., Part A, vol. 2, pp. 587–609 (1964), Hansen et al., Poly. Eng. & Sci., vol. 5, October 1965, pp. 223–226, as well as in U.S. Pat. Nos. 3,440,210; 3,462,517; and 3,549,572. Each of these references, and U.S. Pat. Nos. 3,110,696; 3,117,104; 3,660,438; German Pat. Nos. 2,124,641; 2,140,350; and Belgian Pat. No. 773,596, mention various classes of compounds which they either knew of or discovered as useful for inhibiting copper-catalyzed thermal degradation of polyolefins. The general class of hindered-phenol antioxidants normally used to provide protection to polyolefins against degradation by oxygen fails to provide adequate protection against copper-catalyzed degradation (Hansen et al., supra, and U.S. Pat. No. 3,549,572 col. 1, line 65 through col. 2, line 12 indicate that the presence of the antioxidant actually makes the copper-catalyzed degradation worse than its absence!) although they have been used in combination with some of the copper inhibitor compounds to provide enhanced protection. However, none of these compounds has proven to be completely satisfactory and the problem still awaits a satisfactory solution. Also, as pointed out in Hansen et al., page 594 bottom, predictability in this area is very poor since compounds similar to useful inhibitors were frequently useless. As a result, the use of polyolefins in contact with copper, as for insulation on copper wire for instance, has been limited.

In accordance with the present invention, a new small subgroup of compounds has been discovered, said compounds having the formula degradation of polyolefins, particularly those having a plurality of tertiary carbon atoms or branch points, such as polypropylene, when used in combination with hinderedphenol antioxidants.

These new compounds can be prepared by s reacting hydrazine with a benzoyl chloride in a suitable solvent, such as benzene. The benzoyl chloride can be prepared by reacting a benzoic acid with thionyl chloride in the presence of a basic acid-acceptor, such as pyridine. The benzoic acid may be purchased or may be prepared by oxidation of the corresponding aldehyde; see Yohe et al., J. Org. Chem., 1289 (1956) as explained in U.S. Pat. No. 3,206,431 col. 3 lines 32–35. The benzoic acid and esters thereof are also described in U.S. Pat. Nos. 3,330,859 (Examples 3, 5, 6) and 3,029,276. The benzoyl chloride is also described in U.S. Pat. No. 3,330,859 (Example 5).

For effective stabilization of polyolefins against copper-catalyzed degradation, these new compounds should be used in combination with a hindered-phenol antioxidant. Many hindered-phenol antioxidants are well known and are conventionally used in polyolefins. Illustrative of these hindered-phenol antioxidants are 6,6'-di-t-butyl-4,4'-bis-o-cresol; 4,4'-methylene-bis(3-methyl-6-t-butylphenol); 2,6-di-t-butyl-4-methylphenol; 2,2'-thiobis(4-methyl-6-t-butylphenol); 4,4'-thiobis(3-methyl-6-t-butylphenol); 2,2'-methylenebis(4-ethyl-6-t-butylphenol); the benzyl esters of β-(subst. hydroxyphenyl)propionic acids described in U.S. Pat. No. 3,649,667; tris(3,5-di-t-butyl-4-hydroxybenzyl)isocyanurate of U.S. Pat. Nos. 3,531,483 and 3,637,582; 2,4,6-trialkyl-3-(higher alkylthiomethylene)phenols of U.S. Pat. No. 3,660,352; 1,3,4-thiadiazole-bridged bis-thiomethylene-2,4,6-trialkylphenols of U.S. Pat. No. 3,676,449; and the like. Especially preferred is pentaerythrityl-tetrakis-3-(3,5-di-t-butyl-4-hydroxyphenyl)propionate of U.S. Pat. No. 3,285,855, sold as Irganox 1010.

In general, these new compounds and the hindered-phenol antioxidants are used at total concentrations of about 0.01% to about 10% by weight of polyolefin, and preferably within the range of 0.05% to 3% by weight. The hindered-phenol antioxidant is used in an amount sufficient to stabilize the polyolefin against thermal degradation in the absence of copper, as is described in the foregoing references thereto. The new compound of this invention is used in an amount sufficient to reduce the effect of copper on such thermal degradation in the presence of the hindered-phenol antioxidant.

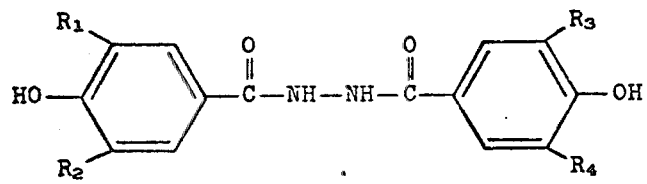

wherein $R_1$, $R_2$, $R_3$, and $R_4$ are each branched-chain alkyl of 3–8 carbon atoms, such as isopropyl, t-butyl, iso-hexyl, cyclohexyl, 2-ethylhexyl, t-octyl, etc. Especially preferred is the compound N,N'-bis(3,5-di-t-butyl-4-hydroxybenzoyl)hydrazine wherein $R_1$, $R_2$, $R_3$, and $R_4$ are each t-butyl. These new compounds have been found to be effective to inhibit copper-catalyzed Usually about equal amounts of each are used although this combination can be used in a weight ratio of 10:1 to 1:10 depending on the use to which the polyolefin is to be put and the environment to which it is to be exposed. The polyolefin composition stabilized by this stabilizer combination may also contain other additives, such as dyes, foaming agents, plasticizers, pigments, etc. as is conventional practice.

The following examples illustrate an especially preferred embodiment of this invention.

EXAMPLE 1

A solution of 12.5 grams of 3,5-di-t-butyl-4-hydroxybenzoic acid in 10 ml. of thionyl chloride containing 5 drops of pyridine was heated at 40°–45° C. for 1 hour. The solution was cooled and 50 ml. of benzene was added. The solution was then evaporated under reduced pressure, and the pale yellow solid thus obtained was dissolved in petroleum ether (30°–60° C.), filtered, and evaporated to dryness leaving 10 grams of pale yellow solid 3,5-di-t-butyl-4-hydroxybenzoyl chloride, m.p. 96°–99° C.

EXAMPLE 2

A solution of 13.4 grams (0.05 mole) of 3,5-di-t-butyl-4-hydroxybenzoyl chloride in 50 ml. of benzene was added dropwise to a cooled solution of 3.2 grams (0.1 mole) of 97% hydrazine in 150 ml. of benzene and a flocculent precipitate formed. The reaction mixture was stirred for 30 minutes and filtered. The white solid precipitate was dissolved in chloroform, washed with aqueous sodium carbonate, dried over magnesium sulfate, and filtered. The filtrate was evaporated under reduced pressure and the white solid residue, N,N'-bis(3,5-di-t-butyl-4-hydroxybenzoyl)hydrazine, was recrystallized from acetonitrile-methanol; m.p. 317°–319° C.

Following similar procedures; 3,5-diisopropyl-4-hydroxybenzoyl chloride; 3-($\alpha$-methylcyclohexyl)-5-isopropyl-4-hydroxybenzoyl chloride; 3,5-di-t-octyl-4-hydroxybenzoyl chloride; 3-sec-butyl-5-(2-ethylhexyl)-4-hydroxybenzoyl chloride and the like can be prepared and reacted with hydrazine to form the corresponding N,N'-bis(3,5-dialkyl-4-hydroxybenzoyl)hydrazines.

EXAMPLE 3

A plurality of samples were prepared for testing by the following procedure. In a pint jar, the appropriate additive or additive combination (as indicated in the following table) was dry-blended with 50 grams of a copolymer of ethylene and propylene wire and cable grade, melt-flow 4.0 (Hercules). The mixture was then milled on a two-roll plastic mill at 170° C. for 3 minutes. The milled polymer was then molded into a plurality of 14 ± 2 mil films at 205° C. by heating in a press for 3 minutes under 28-ton pressure. The films were then cooled by forced air. A 1 150 inch square 16 mil thick piece of 60 mesh copper screen was cleaned by heating in trichloroethylene and air drying, after which it was placed between two pieces of polymer film previously prepared and compression molded at 205° C. for 1.5 minutes to form a laminate 26–28 mils thick. The laminate was aged in a forced draft oven at 140° C. and the efficiencies of the various additives were measured in terms of the time (in hours) for the polymer to become embrittled. The results obtained were:

| Additive* and Concentration | Oven Aging at 140°C. Hours to Embrittlement |
|---|---|
| None | less than 7 |
| 0.2% A | 170 |
| 0.4% D | less than 23 |
| 0.2% A plus 0.2% D | 2000 |
| 0.2% A plus 0.2% K | 1350 |
| 0.2% A plus 0.2% L | 960 |
| 0.2% A plus 0.2% M | 965 |
| 0.2% A plus 0.2% N | 990 |

* In the foregoing table, the additives were
A. A commercially available hindered-phenol antioxidant, Irganox 1010 (Ciba-Geigy), pentaerythrityl tetrakis-3-(3,5-di-t-butyl-4-hydroxyphenyl)propionate
D. The compound of Example 2 of this application, N,N'-bis-(3,5-di-t-butyl-4-hydroxybenzoyl)hydrazine
K. N,N'-bis(2-hydroxy-3,5-di-t-butylbenzoyl)hydrazine, disclosed in Belgian Pat. No. 773,596, Example 4.
L. N,N'-bis-$\beta$-(3,5-di-t-butyl-4-hydroxyphenyl)propionylhydrazine disclosed in U.S. Pat. No. 3,660,438, Example III.
M. N-[$\beta$-(3,5-di-t-butyl-4-hydroxyphenyl)propionyl]-N'-(3,5-di-t-butyl-4-hydroxybenzoyl)hydrazine disclosed in U.S. Pat. No. 3,660,438, Example VI
N. N,N'-bis(2-hydroxybenzoyl)hydrazine disclosed in Belgian Pat. No. 773,596, Example 1.

It is clear from the data in the foregoing table (a) that the compound of this invention (Additive D) has no significant stabilizing properties against copper-catalyzed thermal degradation of polypropylene when used alone, even though the molecule contains hindered-phenol moieties (thus, it is not an antioxidant), (b) the combination of the compound of this invention with a conventional hinderd-phenol antioxidant (Additive A) provides a very high level of protection against copper-catalyzed thermal degradation of polypropylene, and (c)) this combination is about twice as effective as similar combinations using closely related copper inhibitors (Additives K, L, M, or N) in combination with the same hindered-phenol antioxidant.

EXAMPLE 4

A plurality of samples were prepared and tested by the procedure of Example 3. The results obtained were:

| Additive* and Concentration | Oven Aging at 140°C. Hours to Embrittlement |
|---|---|
| None | less than 3 |
| 0.4% D | less than 23 |
| 0.4% B | 105 |
| 0.2% B plus 0.2% D | 1010 |
| 0.4% C | 350 |
| 0.2% C plus 0.2% D | 970 |

*In the foregoing table, the additives were
D. The compound of Example 2 of this application, N,N'-bis(3,5-di-t-butyl-4-hydroxybenzoyl)hydrazine
B. A commercially available hindered-phenol antioxidant, Ethyl 330, 1,3,5-trimethyl-2,4,6-tris(3,5-di-t-butyl-4-hydroxybenzyl)benzene
C. A hindered-phenol antioxidant, bis(4-t-butyl-3-hydroxy-2,6-dimethylbenzyl)dithioterephthalate, described and claimed in U.S. Application Serial No. 283,601 filed August 24, 1972.

As illustrated by the data in the foregoing table, (a) the combinations of the compound of this invention with various known hindered-phenol antioxidants (Additives B and C) provide very high levels of protection against copper-catalyzed thermal degradation of polypropylene and (b) this combination is about three to ten times as effective as the same total weight of the hindered-phenol antioxidant alone.

I claim:

1. A stabilizer composition useful in the enhancement of the resistance of polyolefins to copper-catalyzed thermal degradation compising, in combination, a hindered phenol antioxidant and a compound of the formula

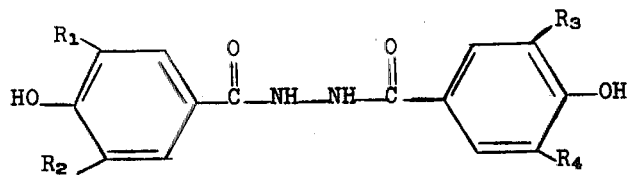

wherein $R_1$, $R_2$, $R_3$, and $R_4$ are each branched-chain alkyl of three to eight carbon atoms, the weight ratio of said hindered phenol antioxidant and said compound being between 10:1 and 1:10.

2. A composition as defined in claim 1 wherein said compound is N,N'-bis(3,5-di-t-butyl-4-hydroxybenzoyl)hydrazine.

3. A composition as defined in claim 2 wherein said hindered-phenol antioxidant is pentaerythrityl tetrakis-3-(3,5-di-t-butyl-4-hydroxyphenyl)propionate.

4. A composition as defined in claim 2 wherein said hindered-phenol antioxidant is 1,3,5-trimethyl-2,4,6-tris)3,5-di-t-butyl-4-hydroxybenzyl)benzene.

5. A composition as defined in claim 1 wherein said hindered-phenol antioxidant is pentaerythrityl tetrakis-3-(3,5-di-t-butyl-4-hydroxyphenyl)propionate.

6. A composition comprising a polyolefin and a stabilizing amount of the stabilizer composition of claim 1.

7. A composition as defined in claim 6 wherein said polyolefin is polypropylene.

8. A composition comprising a polyolefin and a stabilizing amount of the stabilizer composition of claim 2.

9. A composition as defined in claim 8 wherein said polyolefin is polypropylene.

10. Polypropylene stabilized against copper-catalyzed thermal degradation by the combination of (a) an amount of a hindered-phenol antioxidant sufficient to stabilize said polypropylene against thermal degradation in the absence of copper and (b) an amount of a compound of the formula

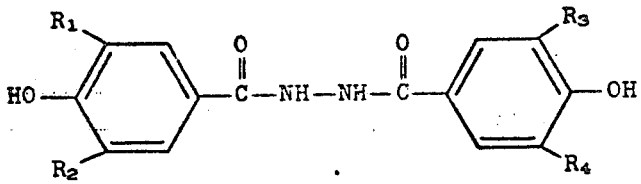

wherein $R_1$, $R_2$, $R_3$, and $R_4$ are each branched-chain alkyl of three to eight carbon atoms sufficient to reduce the effects of copper on such thermal degradation even in the presence of said hindered-phenol antioxidant.

11. A composition as defined in claim 10 wherein $R_1$, $R_2$, $R_3$, and $R_4$ are each t-butyl.

* * * * *